US011023225B2

(12) United States Patent
Wang et al.

(10) Patent No.: US 11,023,225 B2
(45) Date of Patent: Jun. 1, 2021

(54) METHOD AND APPARATUS FOR RESOURCE BINDING

(71) Applicant: Siemens Aktiengesellschaft, Munich (DE)

(72) Inventors: Xiao Feng Wang, Beijing (CN); Yong Yuan, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/496,203

(22) Filed: Apr. 25, 2017

(65) Prior Publication Data
US 2017/0329602 A1 Nov. 16, 2017

(30) Foreign Application Priority Data

May 11, 2016 (CN) .......................... 201610311764.1

(51) Int. Cl.
*G06F 8/70* (2018.01)
*H04W 4/70* (2018.01)
(Continued)

(52) U.S. Cl.
CPC ................. *G06F 8/70* (2013.01); *G06F 8/54* (2013.01); *G06F 9/44521* (2013.01);
(Continued)

(58) Field of Classification Search
CPC .......... G06F 8/10–78; G06F 8/54; G06F 8/70; G06F 9/44521; G06F 16/2455
(Continued)

(56) References Cited

U.S. PATENT DOCUMENTS 9,697,162 B1 * 7/2017 Mattela ............... G06F 13/4068
9,703,899 B1 * 7/2017 Mattela ............... G06F 17/5081
(Continued)

FOREIGN PATENT DOCUMENTS

CN 103810338 A 5/2014
CN 103812937 A 5/2014
(Continued)

OTHER PUBLICATIONS

Chauhan, S., et al., IoTSuite: A Framework to Design, Implement, and Deploy IoT Applications, IPSN '16: Proceedings of the 15th International Conference on Information Processing in Sensor Networks, Apr. 2016, pp. 1-2, [retrieved on Jan. 25, 2021], Retrieved from the Internet: <URL:http://dl.acm.org/>.*
(Continued)

*Primary Examiner* — Geoffrey R St Leger
(74) *Attorney, Agent, or Firm* — Harness, Dickey & Pierce, P.L.C.

(57) ABSTRACT

A method and apparatus for resource binding are disclosed. In an embodiment, the apparatus includes an acquisition module, for acquiring a data constraint of an Internet of Things (IOT) data input point of an algorithm encapsulation module forming an IOT application, the data constraint defining a requirement which must be met by an IOT resource which can be bound to the IOT data input point; a matching module for, on the basis of the acquired data constraint and descriptions of IOT resources in the IOT, searching amongst the IOT resources for an IOT resource matching the IOT data input point; and a binding module for, upon an IOT resource matching the IOT data input point being found, binding the IOT resource found to the IOT data input point. The use of the method and apparatus can reduce the burden on the user during creation of an IOT application.

15 Claims, 9 Drawing Sheets

(51) Int. Cl.
*G06F 8/54* (2018.01)
*G06F 9/445* (2018.01)
*G06F 16/2455* (2019.01)
*H04L 29/08* (2006.01)

(52) U.S. Cl.
CPC .......... *G06F 16/2455* (2019.01); *H04L 67/12* (2013.01); *H04W 4/70* (2018.02)

(58) Field of Classification Search
USPC ........................................ 717/107, 120, 162
See application file for complete search history.

(56) References Cited

U.S. PATENT DOCUMENTS

| | | | |
|---|---|---|---|
| 10,055,205 B2* | 8/2018 | Di Balsamo | G06F 8/4436 |
| 10,229,358 B2* | 3/2019 | Finlay | G06F 16/24542 |
| 2014/0244833 A1 | 8/2014 | Sharma et al. | |
| 2015/0249642 A1* | 9/2015 | Burns | H04L 12/66 726/4 |
| 2016/0103662 A1* | 4/2016 | Di Balsamo | G06F 16/3331 717/107 |
| 2016/0269910 A1* | 9/2016 | Lindqvist | H04W 16/04 |
| 2017/0039474 A1* | 2/2017 | Finlay | G06F 16/24542 |
| 2017/0208139 A1* | 7/2017 | Li | H04L 67/16 |
| 2017/0279682 A1* | 9/2017 | Dawson | H04L 41/0893 |
| 2017/0373855 A1* | 12/2017 | Pritchard | H04W 4/38 |
| 2018/0084403 A1* | 3/2018 | Kode | H04W 8/183 |
| 2018/0152526 A1* | 5/2018 | Xie | H04L 67/16 |
| 2019/0230167 A1* | 7/2019 | Laari | H04L 41/12 |

FOREIGN PATENT DOCUMENTS

| | | |
|---|---|---|
| CN | 104683382 A | 6/2015 |
| WO | WO 2011098123 A1 | 8/2011 |

OTHER PUBLICATIONS

Giang, N. K., et al., Distributed Data Flow: a Programming Model for the Crowdsourced Internet of Things, Proceedings of the Doctoral Symposium of the 16th International Middleware Conference, Dec. 2015, pp. 1-4, [retrieved on Jan. 25, 2021], Retrieved from the Internet: <URL:http://dl.acm.org/>.*

Fersi, G., et al., Middleware for Internet of Things: a study, 2015 International Conference on Distributed Computing in Sensor Systems, Jun. 10-12, 2015, pp. 231-235, [retrieved on Jan. 25, 2021], Retrieved from the Internet: <URL:http://ieeexplore.ieee.org/>.*

Extended European Search Report dated Oct. 4, 2017.
Office Action for Chinese Patent Application No. 201610311764.1 dated Aug. 5, 2019.

* cited by examiner

METHOD AND APPARATUS FOR RESOURCE BINDING

PRIORITY STATEMENT

The present application hereby claims priority under 35 U.S.C. § 119 to Chinese patent application number CN 201610311764.1 filed May 11, 2016, the entire contents of which are hereby incorporated herein by reference.

FIELD

At least one embodiment of the present invention generally relates to the field of the Internet of Things, in particular to a method and apparatus for Internet of Things resource binding.

BACKGROUND

The Internet of Things (IOT) uses communication technology such as local networks or the internet to link together sensors, controllers, robots, people and objects etc. in a new way, to form people-object connections and object-object connections, realizing an informationalized, intelligent network with remote management and control. An IOT generally comprises three layers: an IOT resource layer, an IOT middleware layer and an IOT service layer. The IOT resource layer performs general management of resources in an IOT system, including but not limited to sensors, controllers and/or robots, etc. The IOT service layer provides various IOT applications or services to the user.

At present, many application generators for creating IOT applications have already appeared, e.g. Simulink. These application generators generally provide many reusable algorithm encapsulation modules in advance, wherein each algorithm encapsulation module realizes a specific function; furthermore, all or some of these algorithm encapsulation modules have one or more IOT data input points, each IOT data input point requiring to be bound to a suitable IOT resource in order to provide input data to an algorithm encapsulation module. When it is necessary to create an IOT application for realizing a specific task, the user first of all uses an application generator to select one or more suitable algorithm encapsulation module(s) and connects the selected algorithm encapsulation module(s) according to a data processing work flow of the specific task; then, if a selected algorithm encapsulation module has an IOT data input point, the user manually searches for and finds an IOT resource matching the IOT data input point from an IOT resource bank provided by the application generator, according to the nature of the specific task, and binds the IOT resource found to the IOT data input point. At this point, the creation of the IOT application is complete.

An IOT generally comprises a large number of IOT resources, therefore the user will expend a large amount of time and labour in manually matching and binding IOT resources to IOT data input points during creation of IOT applications. Thus, the existing method of creating IOT applications places a heavy burden on the user.

SUMMARY

Embodiments of the present invention provide a method and apparatus for resource binding, which can reduce the burden on the user when an IOT application is created.

A method for resource binding according to an embodiment of the present invention comprises: acquiring a data constraint of an IOT data input point of an algorithm encapsulation module forming an IOT application, wherein the data constraint defines a requirement which must be met by an IOT resource to be bound to the IOT data input point; on the basis of the acquired data constraint and descriptions of IOT resources in the IOT, searching amongst the IOT resources for an IOT resource matching the IOT data input point; and if an IOT resource matching the IOT data input point is found, binding the IOT resource found to the IOT data input point.

An apparatus for resource binding according to an embodiment of the present invention comprises: an acquisition module, for acquiring a data constraint of an IOT data input point of an algorithm encapsulation module forming an IOT application, wherein the data constraint defines a requirement which must be met by an IOT resource which can be bound to the IOT data input point; a matching module for, on the basis of the acquired data constraint and descriptions of IOT resources in the IOT, searching amongst the IOT resources for an IOT resource matching the IOT data input point; and a binding module for, if an IOT resource matching the IOT data input point is found, binding the IOT resource found to the IOT data input point.

A device according to an embodiment of the present invention comprises: a processor; and a memory, for storing an executable instruction which when executed causes the processor to execute an operation included in the method described above.

A non-transitory computer program product according to an embodiment of the present invention, comprises: a non-transitory machine readable medium on which is stored an executable instruction which when executed causes a machine to execute an operation included in the method described above.

A device, according to an embodiment of the present invention comprises: a processor; and a memory, for storing executable instructions which, when executed, cause the processor to acquire a data constraint of an Internet of Things (IOT) data input point of an algorithm encapsulation module forming an IOT application, the data constraint defining a requirement which must be met by an IOT resource to be bound to the IOT data input point;

search, on the basis of the acquired data constraint and descriptions of IOT resources in the IOT, amongst the IOT resources for an IOT resource matching the IOT data input point; and bind, in response to the searching resulting in an IOT resource matching the IOT data input point being

BRIEF DESCRIPTION OF THE DRAWINGS

Other features, characteristics, advantages and benefits of the present invention will become more obvious through the following detailed description which makes reference to the accompanying drawings. Drawings.

DETAILED DESCRIPTION OF THE EXAMPLE EMBODIMENTS

Figure 1:
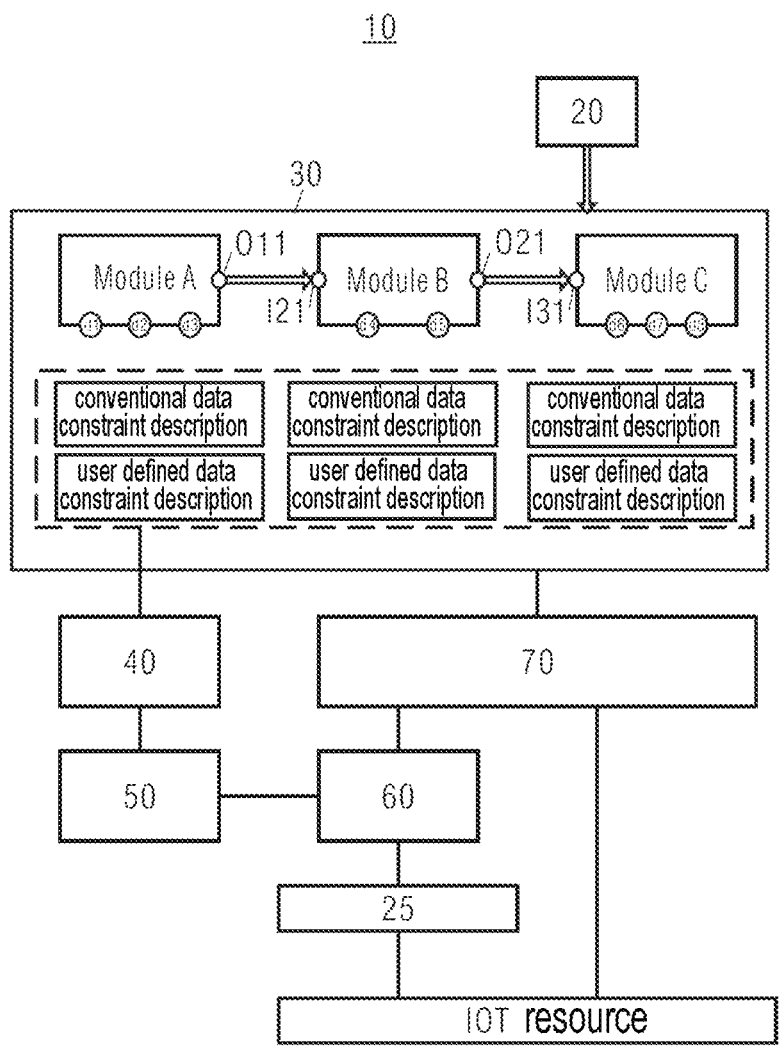
FIG. 1 shows a schematic diagram of the architecture of an application generator according to one embodiment of the present invention.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

A method for resource binding according to an embodiment of the present invention comprises: acquiring a data constraint of an IOT data input point of an algorithm encapsulation module forming an IOT application, wherein the data constraint defines a requirement which must be met by an IOT resource to be bound to the IOT data input point; on the basis of the acquired data constraint and descriptions of IOT resources in the IOT, searching amongst the IOT resources for an IOT resource matching the IOT data input point; and if an IOT resource matching the IOT data input point is found, binding the IOT resource found to the IOT data input point.

In an embodiment, the step of acquiring a data constraint of an IOT data input point of an algorithm encapsulation module forming an IOT application comprises: receiving a user defined data constraint description of the IOT data input point; and on the basis of the user defined data constraint description and a pre-defined data constraint description of the IOT data input point, determining the data constraint of the IOT data input point.

In an embodiment, the IOT data input point comprises multiple IOT data input points, and the user defined data constraint description contains a relationship among at least a portion of IOT resources bound to the multiple IOT data input points.

An apparatus for resource binding according to an embodiment of the present invention comprises: an acquisition module, for acquiring a data constraint of an IOT data input point of an algorithm encapsulation module forming an IOT application, wherein the data constraint defines a requirement which must be met by an IOT resource which can be bound to the IOT data input point; a matching module for, on the basis of the acquired data constraint and descriptions of IOT resources in the IOT, searching amongst the IOT resources for an IOT resource matching the IOT data input point; and a binding module for, if an IOT resource matching the IOT data input point is found, binding the IOT resource found to the IOT data input point.

In an embodiment, the acquisition module comprises: a receiving module, for receiving a user defined data constraint description of the IOT data input point; and a determining module, for determining the data constraint of the IOT data input point on the basis of the user defined data constraint description and a pre-defined data constraint description of the IOT data input point.

In an embodiment, the IOT data input point comprises multiple IOT data input points, and the user defined data constraint description contains a relationship among at least a portion of IOT resources bound to the multiple IOT data input points.

A device according to an embodiment of the present invention comprises: a processor; and a memory, for storing an executable instruction which when executed causes the processor to execute an operation included in the method described above.

A computer program product according to an embodiment of the present invention, comprises: a machine readable medium on which is stored an executable instruction which when executed causes a machine to execute an operation included in the method described above.

It can be seen from the description above that the solution in embodiments of the present invention, on the basis of a data constraint description of an IOT data input point of an algorithm encapsulation module forming an IOT application and descriptions of IOT resources in the IOT, automatically searches for and binds a matching IOT resource to a corresponding IOT data input point, so that compared with the prior art, the solution in embodiments of the present invention can reduce the burden on the user during creation of an IOT application.

In the detailed description below, many specific details are expounded in order to provide a thorough understanding of the present invention, but those skilled in the art should understand that the present invention may also be implemented without the need for these specific details. In addition, in the following detailed description, well known methods, processes and components have not been described in detail, to avoid obscuring the present invention.

Various embodiments of the present invention are described in detail below with reference to the accompanying drawings.

Reference is now made to FIG. 1, which shows a schematic diagram of the architecture of an application generator according to one embodiment of the present invention. As FIG. 1 shows, the application generator 10 may comprise a module bank 20, an IOT resource description layer 25, an editor 30, a semantic constraint parser 40, a resource query generator 50, a resource matcher 60 and a controller 70. The controller 70 may control the operation of the semantic constraint parser 40, resource query generator 50 and resource matcher 60.

The module bank 20 is used for storing pre-supplied reusable algorithm encapsulation modules. Each algorithm encapsulation module realizes a specific function. In one respect, the algorithm encapsulation module may have a module processing data output point, for outputting data generated by the algorithm encapsulation module. In another respect, the algorithm encapsulation module may have a module processing data input point, for receiving, as input data, data outputted by a module processing data output point of another algorithm encapsulation module. In another respect, the algorithm encapsulation module may have one or more IOT data input point(s), which can be bound to a suitable IOT resource in the IOT, to use data provided by the bound IOT resource as input data. The algorithm encapsulation module having the IOT data input point may comprise a conventional data constraint description (which may also be called a predefined data constraint description) relating to the IOT data input point, which defines a general requirement which must be met by an IOT resource which can be bound to the IOT data input point.

The IOT resource description layer 25 may store a description of each IOT resource in the IOT. In one respect, the IOT resource description may store but is not limited to an identifier and type of the IOT resource, the type of data provided by the IOT resource, whether the IOT resource is currently available, etc. In one respect, the IOT resource descriptions stored in the IOT resource description layer 25 may be updated in real time as the IOT resources in the IOT change.

The editor 30 may be operated by the user. When it is desired to create an IOT application for realizing a specific task, the user may use the editor 30 to select one or more suitable algorithm encapsulation module(s) from the module bank 20, and may connect the selected algorithm encapsulation module (s) in a suitable order, on the basis of a data processing work flow of the specific task, to create an IOT application for realizing the specific task. In one example, as shown in FIG. 1, the user has selected three algorithm encapsulation modules Module A, Module B and Module C from the module bank 20 to create an IOT application, wherein a module processing data output point O11 of Module A is connected to a module processing data input point I21 of Module B, and a module processing data output point O21 of Module B is connected to a module processing data input point I31 of Module C. Module A has three IOT data input points (d1, d2, d3), Module B has two IOT data input points (d4, d5) and Module C has three IOT data input points (d6, d7, d8).

After the user has used the editor 30 to create the IOT application, if an algorithm encapsulation module included in the IOT application created has an IOT data input point, the controller 70 can control the semantic constraint parser 40 to instruct the user to input a user defined data constraint description of the IOT data input point of the algorithm encapsulation module. In such a case, if the specific task realized by the IOT application created has a special requirement for an IOT resource bound to the IOT data input point of the algorithm encapsulation module included in the IOT application created, the user can input, as a user defined data constraint description, the special requirement via the semantic constraint parser 40. In one example, as FIG. 1 shows, the user has inputted user defined data constraint descriptions of the algorithm encapsulation modules Module A, Module B and Module C respectively via the semantic constraint parser 40. In one respect, the user defined data constraint descriptions of the IOT data input points of the algorithm encapsulation modules may comprise a relationship among at least a portion of the IOT resources bound to the IOT data input points of the algorithm encapsulation modules.

Figure 2A:
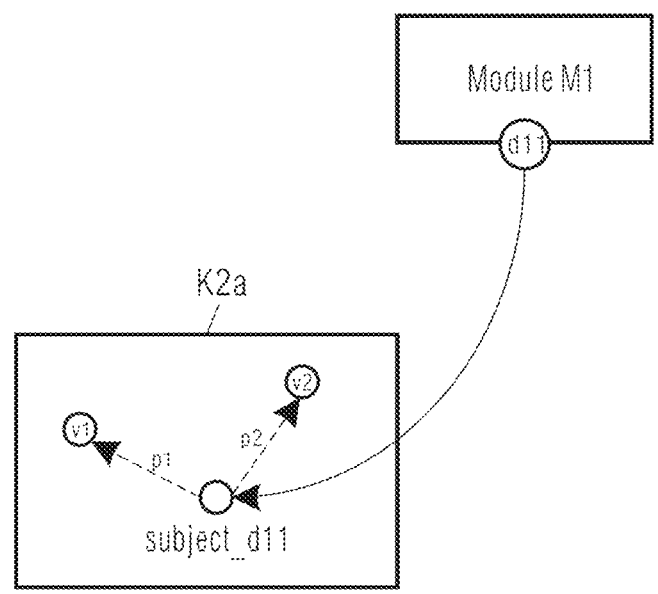
FIG. 2a shows an example of a data constraint description expressed using the RDF according to one embodiment of the present invention.

In one respect, the conventional data constraint description and user defined data constraint description may have the same form and may be expressed using the resource description framework (RDF). The data constraint description expressed using the RDF is a set of three-membered groups, each three-membered group comprising a subject, predicate and object. FIG. 2a shows an example of a data constraint description expressed using the RDF. As FIG. 2a shows, an algorithm encapsulation module (Module M1) comprising an IOT data input point d11 has a data constraint description K2a (conventional data constraint description or user defined data constraint description) expressed using the RDF, comprising two three-member groups (subject_d11-p1-v1) and (subject_d11-p2-v2), wherein subject_d11 indicates an IOT resource to be bound to the IOT data input point d11 of Module M1 and is the subject of the two three-membered groups, p1 and p2 are the respective predicates of the two three-membered groups, and v1 and v2 are the respective objects of the two three-membered groups.

The controller 70 may control the semantic constraint parser 40 to acquire a data constraint of an IOT data input point of an algorithm encapsulation module included in the IOT application created.

In one respect, if an IOT data input point of an algorithm encapsulation module included in the IOT application created only has a conventional data constraint description, then the semantic constraint parser 40 can parse the conventional data constraint description of the IOT data input point of the algorithm encapsulation module, to acquire a data constraint of the IOT data input point of the algorithm encapsulation module. In another respect, if an IOT data input point of an algorithm encapsulation module included in the IOT application created has a conventional data constraint description and a user defined data constraint description simultaneously, then the semantic constraint parser 40 can combine the conventional data constraint description and user defined data constraint description possessed simultaneously by the IOT data input point of the algorithm encapsulation module, to acquire a data constraint of the IOT data input point of the algorithm encapsulation module. In one respect, when the conventional data constraint description and user defined data constraint description are combined to acquire the data constraint, the conventional data constraint description and user defined data constraint description may be combined according to the principle of the conventional data constraint description taking priority or the user defined data constraint description taking priority. If the conventional data constraint description and user defined data constraint description are combined according to the principle of the conventional data constraint description taking priority, then when a constraint in the conventional data constraint description clashes with a constraint in the user defined data constraint description, the constraint in the conventional data constraint description is retained in the data constraint acquired while the constraint in the user defined data constraint description is discarded. Conversely, if the conventional data constraint description and user defined data constraint description are combined according to the principle of the user defined data constraint description taking priority, then when a constraint in the conventional data constraint description clashes with a constraint in the user defined data constraint description, the constraint in the conventional data constraint description is discarded while the constraint in the user defined data constraint description is retained in the data constraint acquired. In the case where the data constraint description is expressed using the RDF, if two three-membered groups have the same subject and predicate, then the two three-membered groups clash.

Figure 2B:
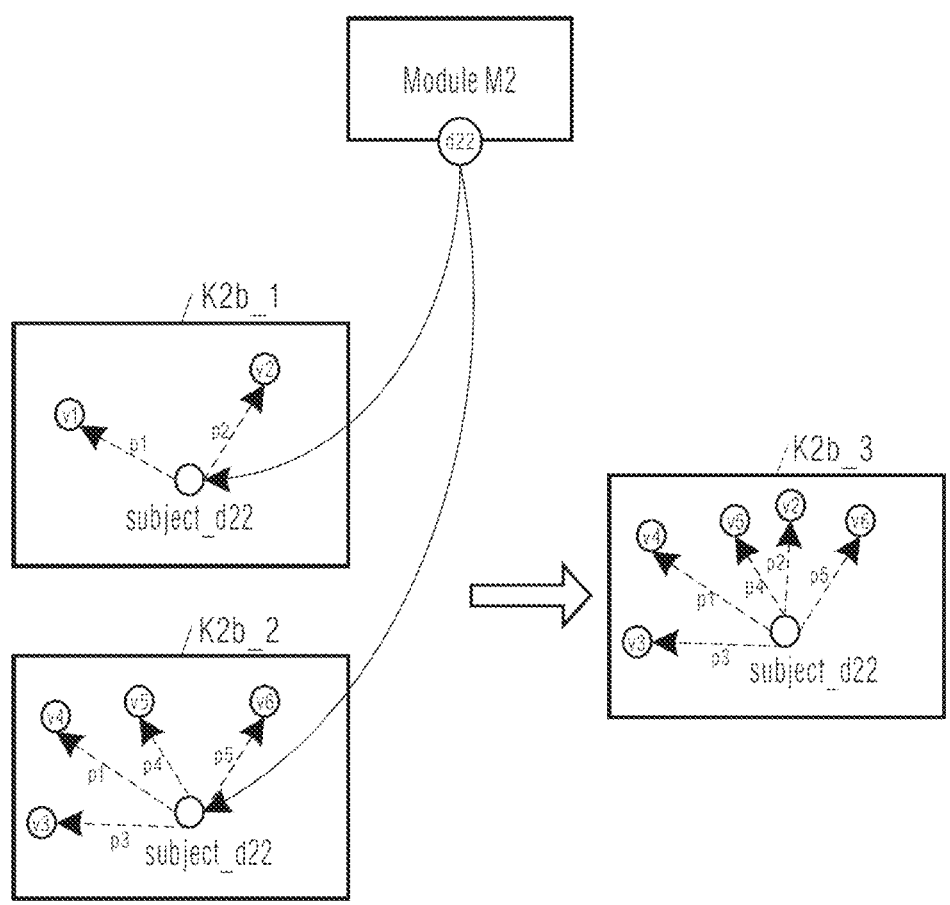
FIG. 2b shows an example of combination of a conventional data constraint description and a user defined data constraint description according to one embodiment of the present invention.

FIG. 2*b* shows an example of combination of a conventional data constraint description and a user defined data constraint description. As FIG. 2*b* shows, an algorithm encapsulation module M2 comprising an IOT data input point d22 comprises a conventional data constraint description K2*b*_1 expressed using the RDF and a user defined data constraint description K2*b*_2 expressed using the RDF, wherein the conventional data constraint description K2*b*_1 comprises two three-membered groups subject_d22-p1-v1 and subject_d22-p2-v2, and the user defined data constraint description K2*b*_2 comprises four three-membered groups subject_d22-p3-v3, subject_d22-p1-v4, subject_d22-p4-v5 and subject_d22-p5-v6. subject_d22 indicates an IOT resource to be bound to the data input point d22 of Module M2. Clearly, the three-membered group subject_d22-p1-v1 in the conventional data constraint description K2*b*_1 and the three-membered group subject_d22-p1-v4 in the user defined data constraint description K2*b*_2 have the same subject and predicate, so these two three-membered groups clash. When combination is carried out according to the principle of the user defined data constraint description taking priority, a data constraint K2*b*_3 (acquired after combination) of the IOT data input point of the algorithm encapsulation module M2 comprises the three-membered groups subject_d22-p2-v2, subject_d22-p3-v3, subject_d22-p1-v4, subject_d22-p4-v5 and subject_d22-p5-v6.

The controller 70 can control the resource query generator 50 to use the acquired data constraint of the IOT data input point of the algorithm encapsulation module included in the IOT application created to generate a resource query instruction. In one respect, the resource query instruction may be an RDF query sentence based on sparq1.

The controller 70 can control the resource matcher 60 to use the resource query instruction generated by the resource query generator 50 and the descriptions of the IOT resources in the IOT which are stored in the resource description layer 25 to search for an IOT resource matching the IOT data input point of the algorithm encapsulation module included in the IOT application created.

If the resource matcher 60 is unable to find a matching IOT resource, then the controller 70 presents notification information to inform the user that a matching IOT resource was not found. If the resource matcher 60 finds a matching IOT resource, then the controller 70 binds the matching IOT resource found to the IOT data input point of the algorithm encapsulation module included in the IOT application created.

Figure 3:
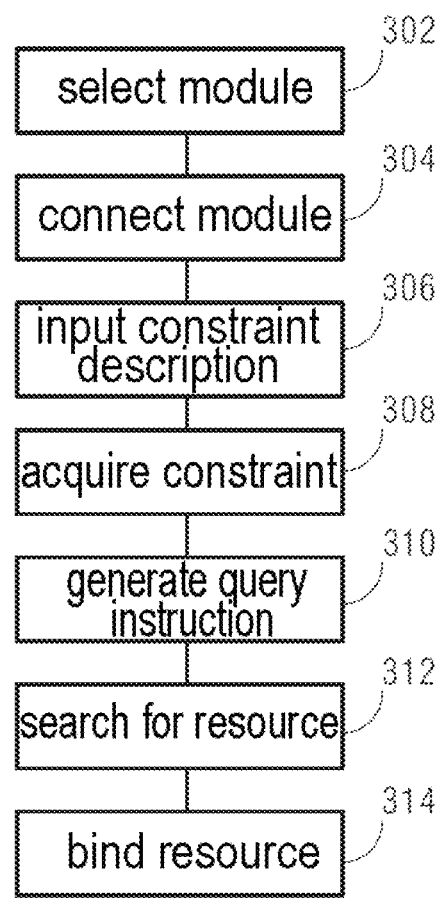
FIG. 3 shows a schematic flow chart of a method for resource binding according to one embodiment of the present invention.

Reference is now made to FIG. 3, which shows a schematic flow chart of a method for resource binding according to one embodiment of the present invention.

In box 302, when it is desired to create an IOT application X for realizing a specific task, the user may use an editor 30 of an application generator 10 to select one or more suitable algorithm encapsulation module(s) from a module bank 20.

In box 304, the user may use the editor 30 of the application generator 10 to connect the selected algorithm encapsulation module(s) in a suitable order to create the IOT application X.

In box 306, if at least one algorithm encapsulation module included in the IOT application X has an IOT data input point, then the controller 70 of the application generator 10 may control a semantic constraint parser 40 to cause the user to input a user defined data constraint description of the IOT data input point of the at least one algorithm encapsulation module.

In box 308, the controller 70 of the application generator 10 may control the semantic constraint parser 40 to parse a data constraint description of an IOT data input point of each algorithm encapsulation module included in the IOT application X, to acquire a data constraint of an IOT data input point of each algorithm encapsulation module included in the IOT application X. If a data constraint description of an IOT data input point of an arbitrary algorithm encapsulation module included in the IOT application X only comprises a conventional data constraint description, then the semantic constraint parser 40 parses the conventional data constraint description of the IOT data input point of the arbitrary algorithm encapsulation module, to acquire a conventional data constraint of the IOT data input point of the arbitrary algorithm encapsulation module. If a data constraint description of an IOT data input point of an arbitrary algorithm encapsulation module included in the IOT application X comprises a conventional data constraint description and a user defined data constraint description, then the semantic constraint parser 40 parses the conventional data constraint description and user defined data constraint description of the IOT data input point of the arbitrary algorithm encapsulation module, to acquire a conventional data constraint of the IOT data input point of the arbitrary algorithm encapsulation module.

In box 310, the controller 70 of the application generator 10 may control a resource query generator 50 to use the acquired data constraint of the IOT data input point of each algorithm encapsulation module included in the IOT application X to generate a resource query instruction.

In box 312, the controller 70 of the application generator 10 controls a resource matcher 60 to use the resource query instruction generated and descriptions of the IOT resources of the IOT which are stored in an IOT resource description layer 25 to search for an IOT resource matching an IOT data input point of each algorithm encapsulation module included in the IOT application X.

In box 314, if the resource matcher 60 finds a matching IOT resource, then the controller 70 binds the matching IOT resource found to an IOT data input point of each algorithm encapsulation module included in the IOT application created. Of course, if the resource matcher 60 is unable to find a matching IOT resource, then the controller 70 presents notification information to inform the user that a matching IOT resource was not found.

It can be seen from the description above that the solution in embodiments of the present invention, on the basis of a data constraint of an IOT data input point of an algorithm encapsulation module of an IOT application and descriptions of the IOT resources in the IOT, automatically searches for an IOT resource matching the IOT data input point of the algorithm encapsulation module of the IOT application, and binds the matching IOT resource found to the IOT data input point of the algorithm encapsulation module of the IOT application. Thus, the solution in embodiments of the present invention makes it unnecessary for a user to manually search for and bind an IOT resource when creating an IOT, so that the burden on the user during creation of an IOT application can be reduced.

Figure 4A:
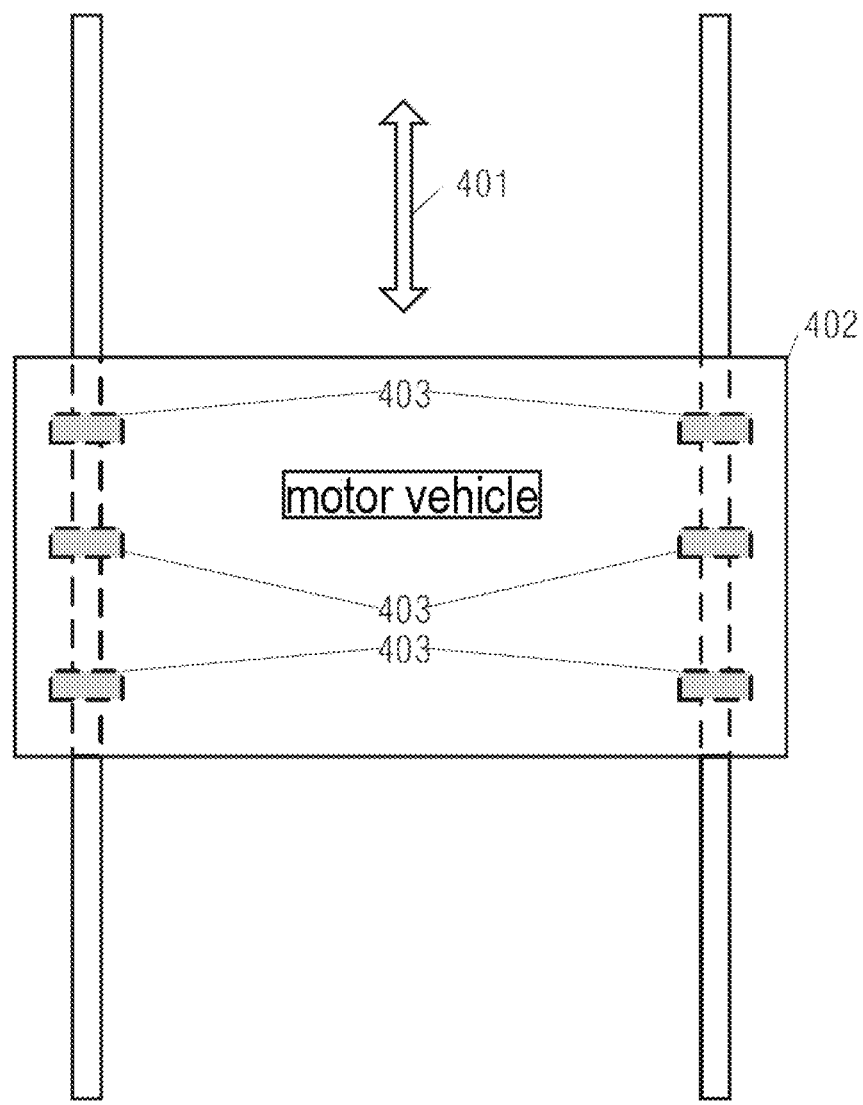
FIG. 4A shows a schematic view of a motor vehicle assembly production line according to one embodiment of the present invention.

The solution in an embodiment of the present invention is explained further below in conjunction with a real case. FIG. 4A shows a top schematic view of a motor vehicle assembly production line. In the motor vehicle assembly production line 400 shown in FIG. 4A, there are many parallel rollers 403 for moving a conveying platform 402 loaded with a motor vehicle forwards and backwards along direction 401; these rollers are driven by electric motors. The electric motors which drive these rollers must be monitored, so that when an electric motor develops an abnormality, the abnormality is discovered immediately, and a maintenance engineer is promptly instructed to repair or replace the electric motor which has developed the abnormality, to prevent the motor vehicle assembly production line from developing a fault.

To this end, many vibration sensors are mounted on these electric motors of the motor vehicle assembly production line, to collect and analyse vibration signals of the electric motors. When the parallel rollers have different loads and have identical loads, the vibration signals of the electric motors are different. Therefore, an algorithm encapsulation module for comparing degrees of similarity between time sequence signals may be used to calculate the degree of similarity between vibration signals of the parallel rollers. On the basis of the degree of similarity between vibration signals of the parallel rollers, an inference may be made as to whether a roller of the motor vehicle assembly production line is operating normally. If it is found that the difference between vibration signals of parallel rollers is very large, an attempt may be made to find an abnormal electric motor by comparing the historical vibration signals and present vibration signals of electric motors. In the case of an abnormal electric motor, a fast Fourier transform (FFT) may be used to convert a vibration signal thereof from the time domain to the frequency domain; then, using the vibration signal in the frequency domain, a possible type of electric motor downgrade can be conjectured, and the remaining useful life thereof can be predicted.

Figure 4B:
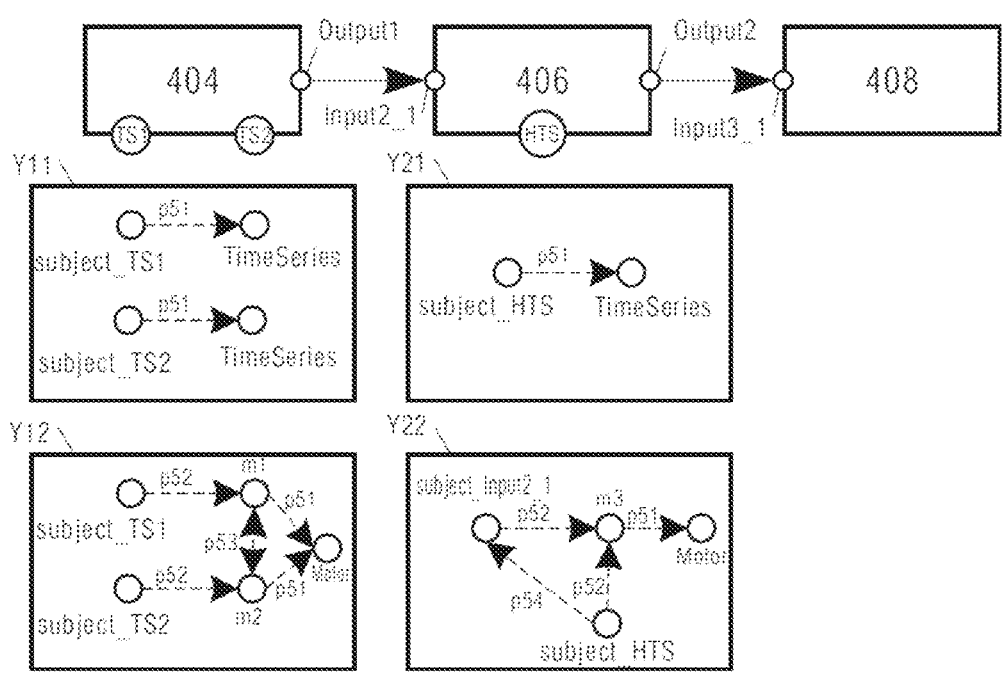
FIG. 4B shows a schematic diagram of an IOT application and data constraint descriptions thereof according to one embodiment of the present invention.

To this end, as shown in FIG. 4B, an IOT application comprising three algorithm encapsulation modules 404, 406 and 408 can be created, to realize the tasks of the analytical work flow above. The algorithm encapsulation module 404 is used for measuring the degree of similarity between two time sequence signals, and has two IOT data input points TS1 and TS2 and a module processing output point Output1. The algorithm encapsulation module 406 is used for identifying an abnormality using historical information, and has an IOT data input point HTS, a module processing input point Input2_1 and a module processing output point Output2. The algorithm encapsulation module 408 is used for converting a vibration signal of an abnormal electric motor from the time domain to the frequency domain, and on the basis of the converted vibration signal in the frequency domain, performing downgrade classification and predicting the remaining useful life of the abnormal electric motor, and has a module processing input point Input3_1. The module processing output point Output1 of the algorithm encapsulation module 404 is connected to the module processing input point Input2_1 of the algorithm encapsulation module 406, and the module processing output point Output2 of the algorithm encapsulation module 406 is connected to the module processing input point Input3_1 of the algorithm encapsulation module 408.

A conventional data constraint description Y11 of the IOT data input points of the algorithm encapsulation module 404 comprises two three-membered groups subject_TS1-p51-TimeSeries and subject_TS2-p51-TimeSeries, wherein the three-membered group subject_TS1-p51-TimeSeries indicates that an IOT resource subject_TS1 bound to IOT data input point TS1 is an example of a time sequence signal, and the three-membered group subject_TS2-p51-TimeSeries indicates that an IOT resource subject_TS2 bound to IOT data input point TS2 is an example of a time sequence signal. Since, in this task, it is desired to use the algorithm encapsulation module 404 to calculate the degree of similarity between vibration signals of parallel rollers, a user has inputted a user defined data constraint description Y12 of the IOT data input points of the algorithm encapsulation module 404, comprising five three-membered groups subject_TS1-p52-m1, subject_TS2-p52-m2, m1-p53-m2, m1-p51-Motor and m2-p51-Motor, wherein the three-membered group subject_TS1-p52-m1 indicates that the IOT resource subject_TS1 bound to IOT data input point TS1 is a vibration signal of m1, the three-membered group subject_TS2-p52-m2 indicates that the IOT resource subject_TS2 bound to IOT data input point TS2 is a vibration signal of m2, the three-membered group m1-p53-m2 indicates that m1 and m2 are parallel, the three-membered group m1-p51-Motor indicates that m1 is an example of an electric motor, and the three-membered group m2-p51-Motor indicates that m2 is an example of an electric motor.

The conventional data constraint description Y21 of the IOT data input point of the algorithm encapsulation module 406 comprises a three-membered group subject_HTS-p51-TimeSeries, which indicates that an IOT resource subject_HTS bound to IOT data input point HTS is an example of a time sequence signal. Since, in this task, it is desired to use the algorithm encapsulation module 406 to determine whether an electric motor is abnormal on the basis of a present vibration signal and a historical vibration signal of the electric motor, the user has inputted a user defined data constraint description Y22 of the IOT data input point of the algorithm encapsulation module 406, comprising four three-membered groups subject_HTS-p54-subject_Input2_1-p52, subject_Input2_1-p52-m3, subject_HTS-p52-m3 and m3-p51-Motor, wherein the three-membered group subject_Input2_1-p52-m3 indicates that an input signal subject_Input2_1 of the module processing input point Input2_1 is a vibration signal of m3, the three-membered group subject_HTS-p54-subject_Input2_1-p52 indicates that the IOT resource subject_HTS bound to the IOT data input point HTS is before the input signal subject_Input2_1 of the module processing input point Input2_1, the three-membered group subject_HTS-p52-m3 indicates that the IOT resource subject_HTS bound to the IOT data input point HTS is a vibration signal of m3, and the three-membered group m3-p51-Motor indicates that m3 is an example of an electric motor.

Those skilled in the art should understand that although the conventional data constraint descriptions and user defined data constraint descriptions in the embodiment above are expressed using the RDF, the present invention is not limited to this. In other embodiments of the present invention, conventional data constraint descriptions and user defined data constraint descriptions could also be expressed in other suitable forms.

Those skilled in the art should understand that in other embodiments of the present invention, the application generator 10 could also check matching between a module processing input point and a module processing output point connected with each other in any two adjacent algorithm encapsulation modules included in the IOT application created.

Those skilled in the art should understand that in other embodiments of the present invention, after an IOT data point of an algorithm encapsulation module included in an IOT application has been bound to an IOT resource, a check can be carried out before each time the IOT application is run, to find out whether an IOT resource bound to an IOT data input point of an algorithm encapsulation module included in the IOT application is available, and when the check finds that an IOT resource bound to a particular IOT data input point of an algorithm encapsulation module included in the IOT application is not available, the solution disclosed in the embodiment of the present invention above searches for another IOT resource matching the particular IOT data input point and binds an IOT resource found to the particular IOT data input point.

Figure 5:
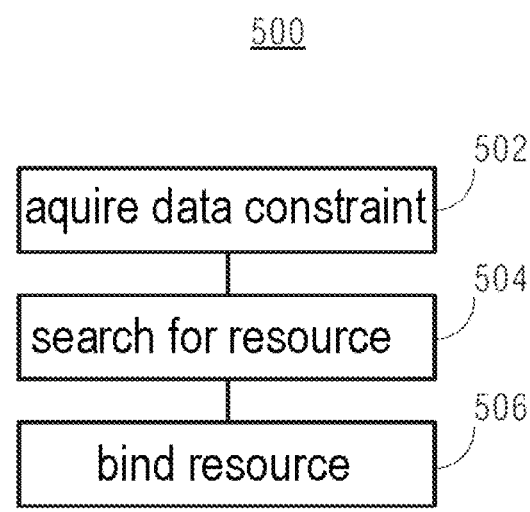
FIG. 5 shows a flow chart of a method for resource binding according to another embodiment of the present invention.

Reference is now made to FIG. 5, which shows a flow chart of a method for resource binding according to one embodiment of the present invention. The method 500 shown in FIG. 5 may be, but is not limited to being, implemented by the application generator 10.

As FIG. 5 shows, the method 500 may comprise, in box 502, acquiring a data constraint of an IOT data input point of an algorithm encapsulation module forming an IOT application, wherein the data constraint defines a requirement which must be met by an IOT resource to be bound to the IOT data input point.

The method 500 may also comprise, in box 504, on the basis of the acquired data constraint and descriptions of IOT resources in the IOT, searching amongst the IOT resources for an IOT resource matching the IOT data input point.

The method 500 may also comprise, in box 506, if an IOT resource matching the IOT data input point is found, binding the IOT resource found to the IOT data input point.

In one respect, box 502 may comprise: receiving a user defined data constraint description of the IOT data input point; and on the basis of the user defined data constraint description and a pre-defined data constraint description of the IOT data input point, determining the data constraint of the IOT data input point.

In another respect, the IOT data input point comprises multiple IOT data input points, and the user defined data constraint description contains a relationship among at least a portion of the multiple IOT data input points.

Figure 6:
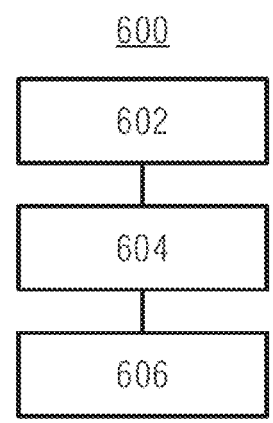
FIG. 6 shows a schematic diagram of an apparatus for resource binding according to one embodiment of the present invention.

Reference is now made to FIG. 6, which shows a schematic diagram of an apparatus for resource binding according to one embodiment of the present invention. The apparatus 600 shown in FIG. 6 may be implemented using software, hardware (e.g. integrated circuits or a DSP), or a combination of software and hardware.

As FIG. 6 shows, the apparatus 600 may comprise an acquisition module 602, a matching module 604 and a binding module 606. The acquisition module 602 may be used for acquiring a data constraint of an IOT data input point of an algorithm encapsulation module forming an IOT application, wherein the data constraint defines a requirement which must be met by an IOT resource which can be bound to the IOT data input point. The matching module 604 may be used for searching amongst the IOT resources for an IOT resource matching the IOT data input point on the basis of the acquired data constraint and descriptions of IOT resources in the IOT. The binding module 608 may be used for, if an IOT resource matching the IOT data input point is found, binding the IOT resource found to the IOT data input point.

In one respect, the acquisition module 602 may comprise: a receiving module, for receiving a user defined data constraint description of the IOT data input point; and a determining module, for determining the data constraint of the IOT data input point on the basis of the user defined data constraint description and a pre-defined data constraint description of the IOT data input point.

In another respect, the IOT data input point comprises multiple IOT data input points, and the user defined data constraint description contains a relationship among at least a portion of the IOT resources bound to the multiple IOT data input points.

Figure 7:
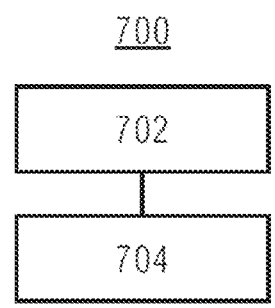
FIG. 7 shows a schematic diagram of a device for resource binding according to one embodiment of the present invention.

Reference is now made to FIG. 7, which shows a schematic diagram of a device for resource binding according to one embodiment of the present invention. As FIG. 7 shows, the device 700 may comprise a processor 702 and a memory 704 for storing executable instructions, wherein the executable instructions, when executed, cause the processor 702 to execute the operations included in the methods described above.

An embodiment of the present invention also provides a computer program product, comprising a machine readable medium on which are stored executable instructions, which when executed cause the machine to execute the operations included in the methods described above.

Those skilled in the art should understand that various changes in form and amendments may be made to the embodiments disclosed above without deviating from the substance of the invention. Thus, the scope of protection of the present invention shall be defined by the attached claims.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for Internet of Things (IOT) resource binding, comprising:
    acquiring a data constraint of an IOT data input point of a pre-formed, reusable algorithm encapsulation module forming an IOT application and a description of an IOT resource in the IOT application, via an application generator, the data constraint defining a requirement which must be met by an IOT resource to be bound to the IOT data input point and to provide input data from the IOT resource to the algorithm encapsulation module at the data input point, the IOT resource being a sensor, a controller or a robot;
    generating a resource query instruction using the acquired data constraint of the IOT data input point of each algorithm encapsulation module included in the IOT application;
    searching, on the basis of the acquired data constraint, using the resource query instruction and descriptions of IOT resources in the IOT, amongst the IOT resources for an IOT resource matching the IOT data input point;
    binding, in response to the searching resulting in an IOT resource matching the IOT data input point being found, the found IOT resource to the IOT data input point; and
    notifying a user when an IOT resource matching the IOT data input point is not found.

2. The method of claim 1, wherein the acquiring of a data constraint of an IOT data input point of an algorithm encapsulation module forming an IOT application comprises:
    receiving a user defined data constraint description of the IOT data input point of the algorithm encapsulation module; and
    determining, on the basis of the user defined data constraint description and a defined data constraint description of the IOT data input point, the data constraint of the IOT data input point.

3. The method of claim 2, wherein:
    the IOT data input point comprises multiple IOT data input points, and
    the user defined data constraint description includes a relationship among at least a portion of IOT resources bound to the multiple IOT data input points.

4. A non-transitory computer-readable medium storing program sections, readable in and executable by a processor, to carry out the method of claim 3 when the program sections are executed by the processor.

5. A non-transitory computer-readable medium storing program sections, readable in and executable by a processor, to carry out the method of claim 2 when the program sections are executed by the processor.

6. A non-transitory computer-readable medium storing program sections, readable in and executable by a processor, to carry out the method of claim 1 when the program sections are executed by the processor.

7. The method of claim 1, wherein the data constraint includes a set of three-membered groups, each three-membered group comprising a subject, predicate and object.

8. An apparatus for Internet of Things (IOT) resource binding, comprising:
    memory storing computer-readable instructions; and
    one or more processors configured to execute the computer-readable instructions such that the one or more processors are configured to perform operations including,
    acquiring a data constraint of an IOT data input point of a pre-formed, reusable algorithm encapsulation module forming an IOT application and a description of an IOT resource in the IOT application, via an application generator, the data constraint defining a requirement which must be met by an IOT resource to be bound to the IOT data input point and to provide input data from the IOT resource to the algorithm encapsulation module at the data input point, the IOT resource being a sensor, a controller or a robot;
    generating a resource query instruction using the acquired data constraint of the IOT data input point of each algorithm encapsulation module included in the IOT application;
    searching, on the basis of the acquired data constraint using the resource query instruction and descriptions of IOT resources in the IOT, amongst the IOT resources for an IOT resource matching the IOT data input point;
    binding, in response to the search resulting in an IOT resource matching the IOT data input point being found, the found IOT resource to the IOT data input point; and
    notifying a user when an IOT resource matching the IOT data input point is not found.

9. The apparatus of claim 8, wherein the one or more processors are further configured to:
    receive a user defined data constraint description of the IOT data input point of the algorithm encapsulation module; and
    determine the data constraint of the IOT data input point on the basis of the user defined data constraint description and a defined data constraint description of the IOT data input point.

10. The apparatus of claim 9, wherein
the IOT data input point comprises multiple IOT data input points, and
the user defined data constraint description includes a relationship among at least a portion of IOT resources bound to the multiple IOT data input points.

11. The apparatus of claim 8, wherein the data constraint includes a set of three-membered groups, each three-membered group comprising a subject, predicate and object.

12. A device, comprising:
a processor; and
a memory, for storing executable instructions which, when executed, cause the processor to
acquire a data constraint of an Internet of Things (JOT) data input point of a pre-formed, reusable algorithm encapsulation module forming an IOT application and a description of an IOT resource in the IOT application, via an application generator, the data constraint defining a requirement which must be met by an IOT resource to be bound to the IOT data input point and to provide input data from the IOT resource to the algorithm encapsulation module at the data input point, the IOT resource being a sensor, a controller or a robot;
generate a resource query instruction using the acquired data constraint of the IOT data input point of each algorithm encapsulation module included in the IOT application;
search, on the basis of the acquired data constraint using the resource query instruction and descriptions of IOT resources in the IOT, amongst the IOT resources for an IOT resource matching the IOT data input point;
bind, in response to the searching resulting in an IOT resource matching the IOT data input point being found, the found IOT resource to the IOT data input point; and
notify a user when an IOT resource matching the IOT data input point is not found.

13. The device of claim 12, wherein the memory further stores executable instructions which, when executed, cause the processor to perform the acquiring, wherein during the acquiring of a data constraint of an IOT data input point of an algorithm encapsulation module forming an IOT application, the executable instructions, when executed, cause the processor to
receive a user defined data constraint description of the IOT data input point; and
determine, on the basis of the user defined data constraint description and a defined data constraint description of the IOT data input point, the data constraint of the IOT data input point.

14. The device of claim 13, wherein:
the IOT data input point comprises multiple IOT data input points, and
the user defined data constraint description includes a relationship among at least a portion of IOT resources bound to the multiple IOT data input points.

15. The device of claim 12, wherein the data constraint includes a set of three-membered groups, each three-membered group comprising a subject, predicate and object.

* * * * *